(12) United States Patent
Liu

(10) Patent No.: US 9,072,321 B2
(45) Date of Patent: Jul. 7, 2015

(54) ELECTRONIC SMOKE

(75) Inventor: Loi Ying Liu, Hong Kong (CN)

(73) Assignee: MINILOGIC DEVICE CORPORATION LTD., Shatin, N.T. (HK)

(*) Notice: Subject to any disclaimer, the term of this patent is extended or adjusted under 35 U.S.C. 154(b) by 391 days.

(21) Appl. No.: 13/131,705

(22) PCT Filed: Jun. 29, 2010

(86) PCT No.: PCT/IB2010/052949
§ 371 (c)(1),
(2), (4) Date: May 27, 2011

(87) PCT Pub. No.: WO2011/033396
PCT Pub. Date: Mar. 24, 2011

(65) Prior Publication Data
US 2012/0186594 A1    Jul. 26, 2012

(30) Foreign Application Priority Data

Sep. 18, 2009 (CN) .................. 2009 2 0179316 U

(51) Int. Cl.
*A24F 47/00* (2006.01)
*G01F 1/28* (2006.01)
*G01P 13/00* (2006.01)

(52) U.S. Cl.
CPC ............... *A24F 47/008* (2013.01); *G01F 1/28* (2013.01); *G01P 13/0026* (2013.01); *G01P 13/0033* (2013.01)

(58) Field of Classification Search
CPC . A24F 47/002; A24F 47/008; G01P 13/0033; G01P 13/0026
USPC .......................................... 131/273, 328, 329
See application file for complete search history.

(56) References Cited

U.S. PATENT DOCUMENTS

| 2,200,863 | A | * | 5/1940 | Schuck ................... 340/870.43 |
| 2,907,320 | A | * | 10/1959 | De Weese et al. ............ 600/538 |
| 3,389,601 | A | * | 6/1968 | Semplak .................... 73/170.17 |
| 3,534,728 | A | * | 10/1970 | Barrows ....................... 600/483 |

(Continued)

FOREIGN PATENT DOCUMENTS

| CN | 1040914 A | 4/1990 |
| CN | 1791790 A | 6/2006 |

(Continued)

OTHER PUBLICATIONS

International Search Report for PCT/IB2010/052949 Dated Apr. 21, 2011.

*Primary Examiner* — Matthew Daniels
(74) *Attorney, Agent, or Firm* — Nixon Peabody LLP; Jeffrey L. Costellia

(57) ABSTRACT

An electronic smoke comprising an inhale detector and a smoke effect generating circuitry. The inhale detector comprises an air-flow sensor which is arranged to detect direction and rate of air flow through the smoke apparatus, and the smoke effect generating circuitry is arranged to operate the smoke effect generating circuitry to generate smoking effect when the air flow direction corresponds to inhaling through the apparatus and the air flow rate reaches at predetermined threshold. Such an electronic smoke alleviates the problem of inadvertent triggering due to environmental vibration or noise or children playing by blowing into the device.

15 Claims, 6 Drawing Sheets

(56) References Cited

U.S. PATENT DOCUMENTS

| | | | |
|---|---|---|---|
| 3,814,998 A * | 6/1974 | Thoma et al. | 361/283.4 |
| 3,946,726 A * | 3/1976 | Pikul | 600/538 |
| 3,965,746 A * | 6/1976 | Rabek | 73/718 |
| 4,141,252 A * | 2/1979 | Lodge | 73/724 |
| 4,206,644 A * | 6/1980 | Platt | 250/231.19 |
| 4,488,439 A * | 12/1984 | Gast et al. | 73/861.18 |
| 4,490,773 A * | 12/1984 | Moffatt | 361/283.4 |
| 4,599,907 A * | 7/1986 | Kraus et al. | 73/861.74 |
| 4,876,892 A * | 10/1989 | Arabia et al. | 73/718 |
| 4,922,901 A | 5/1990 | Brooks et al. | |
| 5,107,860 A * | 4/1992 | Malouvier et al. | 600/533 |
| 5,134,886 A * | 8/1992 | Ball | 73/718 |
| 7,353,711 B2 | 4/2008 | O'Dowd et al. | |
| 2002/0005207 A1* | 1/2002 | Wrenn et al. | 131/194 |
| 2004/0187589 A1 | 9/2004 | Ferran | |
| 2005/0016550 A1* | 1/2005 | Katase | 131/194 |
| 2005/0229710 A1 | 10/2005 | O'Dowd et al. | |
| 2010/0242974 A1 | 9/2010 | Pan | |
| 2011/0304282 A1* | 12/2011 | Li et al. | 315/362 |
| 2012/0234315 A1* | 9/2012 | Li et al. | 128/200.21 |

FOREIGN PATENT DOCUMENTS

| | | |
|---|---|---|
| CN | 1864054 A | 11/2006 |
| CN | 201199922 Y | 3/2009 |
| CN | 101518361 A | 9/2009 |
| CN | 101524187 A | 9/2009 |
| CN | 201490998 U | 5/2010 |
| CN | 1864054 B | 8/2012 |
| EP | 0488488 A1 | 6/1992 |
| JP | H0348166 | 3/1991 |
| JP | H09113326 | 5/1997 |
| JP | 2005034021 | 2/2005 |
| WO | WO2004/080216 A1 | 9/2004 |

* cited by examiner

ELECTRONIC SMOKE

FIELD OF THE INVENTION

The present invention relates to electronic smoke apparatus (or electronic smoke in short), and more particularly to electronic cigarettes. The present invention also relates to air-flow rate and direction detector for use in an electronic smoke apparatus.

BACKGROUND OF THE INVENTION

Electronic smoke apparatus such as electronic cigarettes provide a smoking alternative to smokers. An electronic smoke is a non-naked flame smoking apparatus which typically comprises a battery powered heater arranged to vaporize liquid nicotine or nicotine substitutes upon actuation by a user. The heater is usually automatically actuated by a controller when a user inhales through the electronic smoke to simulate a smoking action. Typically, an inhaling detector is provided in an electronic smoke and the controller, such as a digital signal processor (DSP) will actuate the heater when inhaling is detected by the inhaling detector. An exemplary equivalent application circuit of a conventional electronic cigarette is shown in FIG. 1.

The inhaling detector of a conventional electronic smoke apparatus typically comprises an air-flow sensor having a structure similar to that of a conventional microphone condenser of FIG. 2. A typical air-flow sensor of a conventional electronic smoke comprises a variable capacitor (Cs) comprising a membrane and a back plate, a pre-charged electret layer (Vs), and a junction field effect transistor (JFET) arranged as schematically shown in FIG. 2. The DSP of the smoking circuitry is arranged to actuate the heater automatically when vibration, which is assumed to be due to inhaling, is detected by the air-flow sensor. However, such an arrangement is not very reliable since false actuations are common, especially in a noisy environment. Furthermore, the structure of a conventional air-flow sensor is relatively complicated and more expensive, since a JFET stage is required to amplify signals detected by the vibrating membrane and an electret layer is in combination with a back plate to form a reference capacitive surface.

Therefore, it would be advantageous if an improved air-flow sensor for an electronic smoke could be provided.

In this specification, the terms electronic smoke and electronic smoke apparatus are equivalent and includes electronic smoke apparatus which are commonly known as electronic cigarettes, electronic cigar, e-cigarette, personal vaporizers etc., without loss of generality.

SUMMARY OF INVENTION

According to the present invention, there is provided an electronic smoke comprising an inhale detector and a smoke effect generating circuitry, wherein the inhale detector comprises an air-flow sensor which is arranged to detect direction and rate of air flow through the smoke apparatus, and wherein the smoke effect generating circuitry is arranged to operate the smoke effect generating circuitry to generate smoking effect when the air flow direction corresponds to inhaling through the apparatus and the air flow rate reaches at predetermined threshold. Such an electronic smoke alleviates the problem of inadvertent triggering due to environmental vibration or noise or children playing by blowing into the device.

In an embodiment, the air-flow sensor may comprise an air-baffle surface which is adapted to deform in response to movement of air through the apparatus, the extent of deformation of the air-baffle surface being measured to determine both the direction and rate of air flow through the apparatus. Measure of deformation within a predetermined period of time further mitigates the risk of inadvertent triggering due to vibrations or environmental noise.

As an example, the capacitance or the change in capacitance of the air-flow sensor may be measured to determine the extent of deformation of the air-baffle surface.

In an embodiment, the smoke effect generating circuitry may comprise a processor which is adapted to measure the capacitance or change in capacitance of the air-flow sensor. As a controller or processor is usually require to operate the heater of the smoke, measuring the capacitance or change in capacitance by the processor means an unexpected cost effective solution.

As a further example, the air-flow sensor may form part of an oscillator circuit, and the processor is arranged to measure the oscillation frequency of the oscillation circuit to determine the air-flow rate and direction. As the oscillation frequency of an oscillator circuit, especially an LC oscillator circuit, is dependent on the capacitance value, this provides a cost effective solution to provide a low cost and compact solution.

As an example, the predetermined threshold of air flow rate may correspond to the flow rate of a typical smoke inhaling action by a user through the apparatus. This would operate to prevent triggering of the smoke generating circuitry by mischief or accidental vibration or noise.

In an embodiment, the air-flow sensor may comprise a conductive air baffle surface which is spaced apart from a base conductive surface, and the air baffle surface is adapted to deform in response to air flow through the apparatus; characterized in that the variation in capacitance between the baffle surface and the base surface is indicative of the direction and rate of air flow.

In another aspect of the present invention, there is provided an air-flow rate and direction detector comprising an air-flow sensor and a controller, wherein the air flow sensor comprises a baffle surface which is adapted to deform in response air flow, and the controller is adapted to determine the air-flow rate and direction with reference to the extent of deformation of the baffle surface.

The controller of the detector may be adapted to determine the air-flow rate and direction with reference to the capacitance or variation of capacitance of the air-flow sensor.

The controller may comprise an oscillation circuit, and the air-flow rate sensor forms part of the oscillator circuit; characterized in that the controller is adapted to determine the air-flow rate and direction with reference to the oscillator frequency or variation in oscillator frequency of the oscillator.

The detector may be adapted for use in electronic cigarettes or smoke for heater triggering, or in articles operated by suction- or blowing, such as wind-blow instruments like electronic recorders or toys.

BRIEF DESCRIPTION OF FIGURES

Embodiments of the present invention will be explained below by way of example with reference to the accompanying drawings, in which:—

DETAILED DESCRIPTION OF EXEMPLARY EMBODIMENTS

Figure 8:
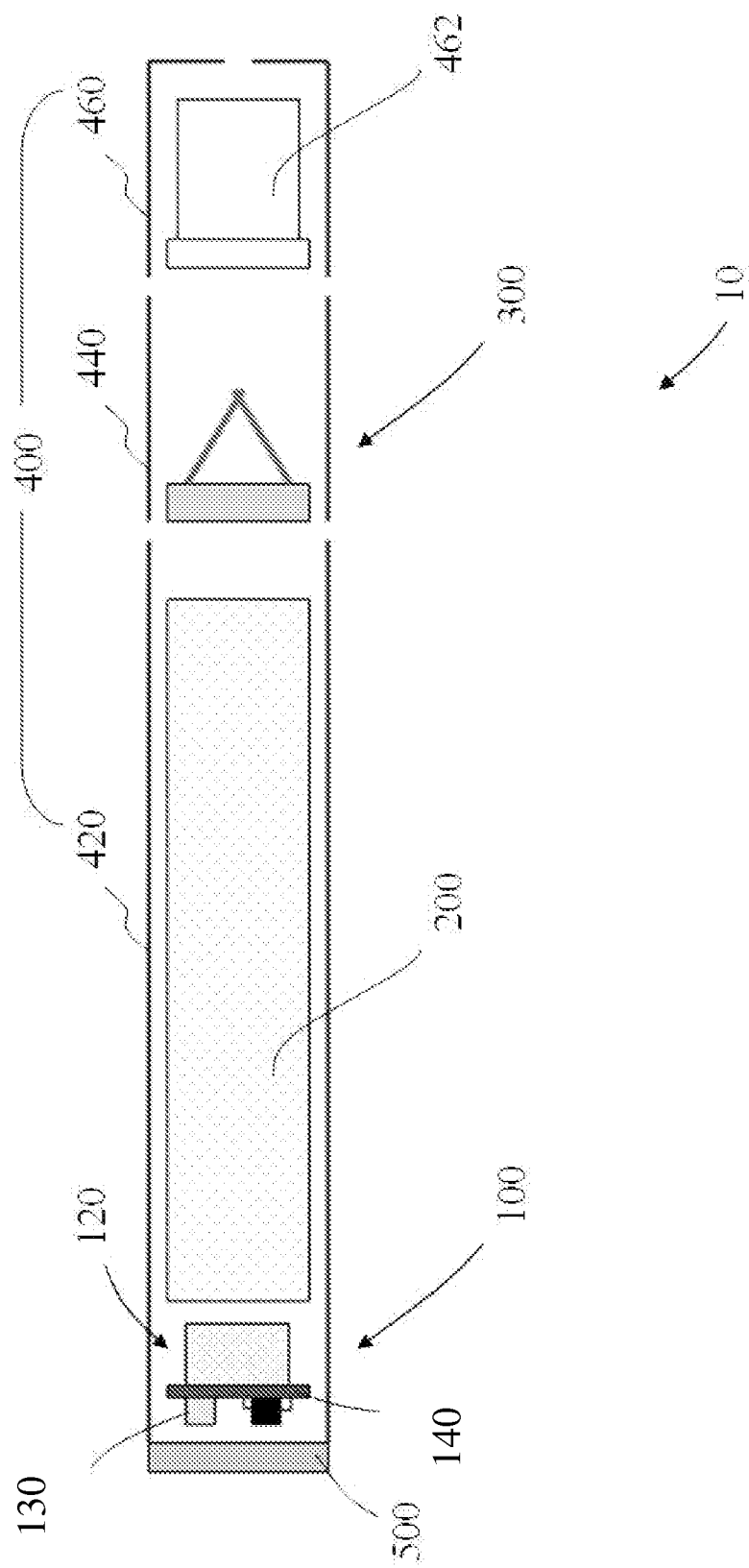
FIG. 8 is a schematic diagram illustrating an exemplary embodiment of an electronic smoke of the present invention.

The electronic cigarette (10) as an example of an electronic smoke as shown in FIG. 8 comprises an inhale detector (100) as an example of an air-flow rate and direction detector, a battery (200) as an example of stored power source, a nicotine source as a example of a smoke or favor (or aroma) source, and a heating element (300) as a heating means. The inhale detector, the battery and the heating element are all housed within a main housing (400) which comprises a first tubular portion (420) in which the battery and the inhale detector are mounted, a second tubular portion (440) in which the heating element and the nicotine source are mounted, and a third tubular portion (460) containing a mouth piece (462). In addition, a transparent or translucent cover (500) is attached to the downstream end of the first tubular portion.

Figure 4:
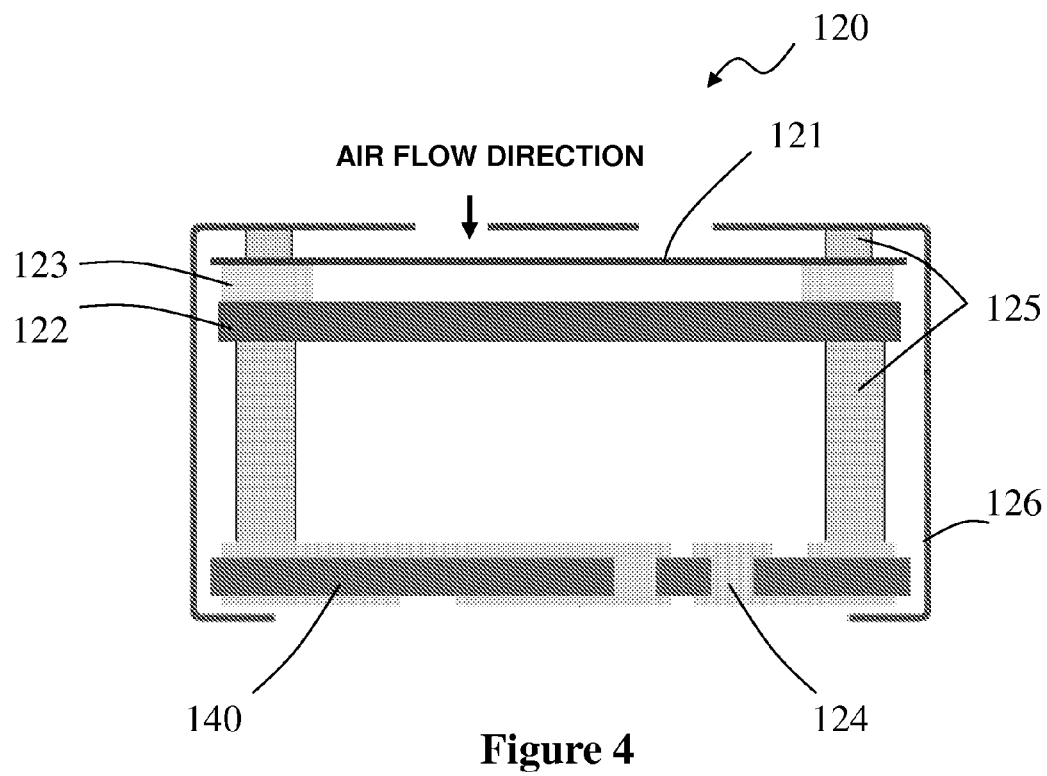
FIG. 4 is a schematic diagram of an air-flow sensor for an electronic smoke according to an embodiment of the present invention.

The inhale detector is a modular assembly comprising an air-flow sensor (120), an actuation circuit and an LED light source (130), which are all mounted on a printed circuit board (140). Referring to FIG. 4, the air-flow sensor comprises a rigid or semi-rigid conductive membrane (121), such as a metallic sheet which are mounted above a conductive back plate (122) in a spaced apart manner and separated by an insulating spacer (123). The sub-assembly comprising the conductive membrane and the conductive back plate arranged in a spaced apart and substantially parallel manner forms a capacitive component, the instantaneous capacitance value or variation in capacitance value of which will be utilized in a manner to be discussed in more detail below.

As the conductive will need to respond rapidly to repeated inhaling and to return to its neutral or standby condition quickly or immediately after inhaling stops, a metallic sheet having a good axial resilience property is preferred to be used as the conductive membrane. The conductive back plate is connected to an earth plate (124), which is in turn mounted on a PCB, by a conductive ring (125) to form a reference ground of the capacitive component. This sub-assembly of the air-flow sensor and PCB is housed within a metallic can (126) which defines an air inlet and an air outlet at its axial ends.

Figure 6A:
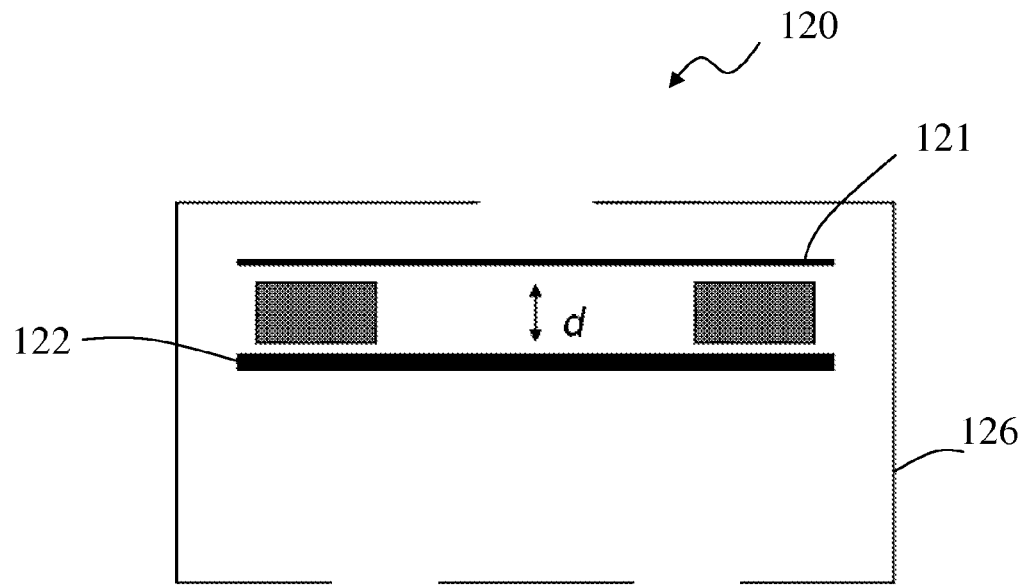
Figure 6B:
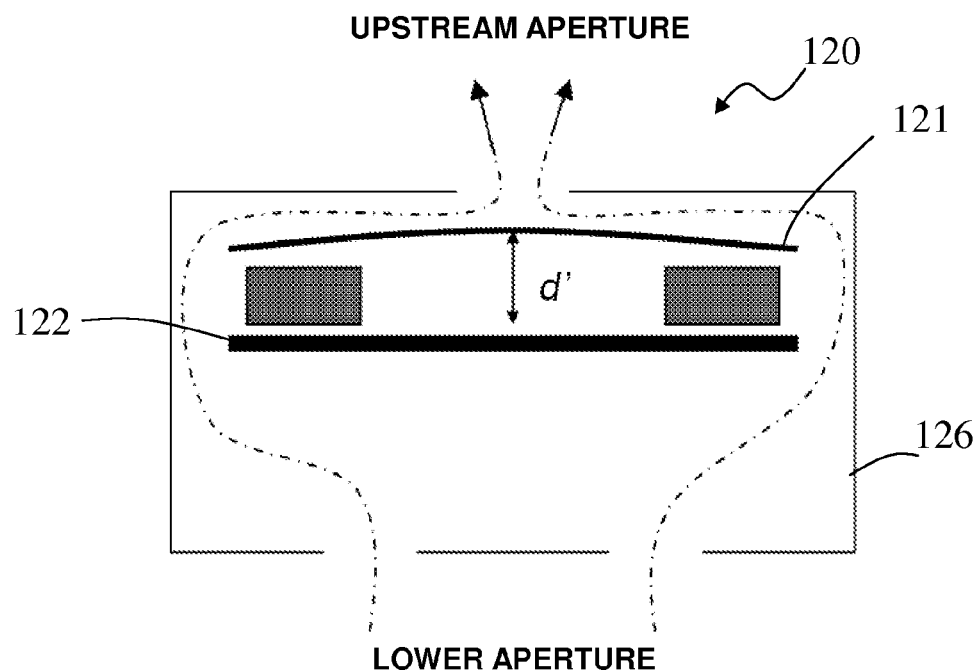
Figure 6C:
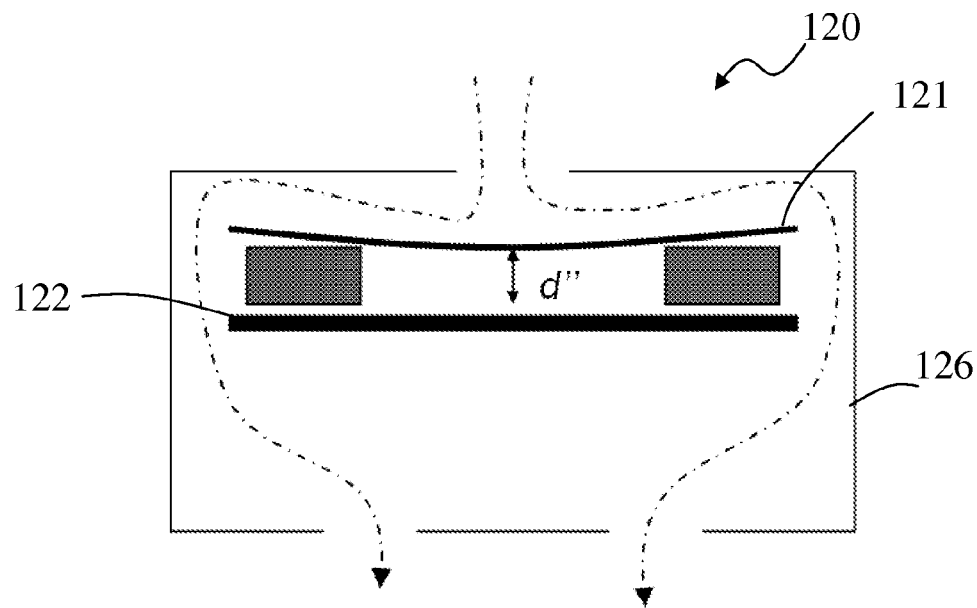

The capacitive properties of the air-flow sensor of FIG. 4 would be readily apparent from the schematic representations of FIGS. 6A to 6C. The schematic diagram of FIG. 6A shows the air-flow sensor when there is no or negligible air flow through the sensor. In this condition, the conductive membrane and the conductive back plate are substantially parallel with a separation distance d. The capacitive value of the sensor in this stand-by or rest condition is given by the relationship $C = \in A/d$, where C is the capacitance, $\in$ is the dielectric constant of the spacing medium, and is the overlapping surface area between the conductive membrane and the back plate. As an example, the capacitance value of a sensor with a diameter or 8 mm and a separation of 0.04 mm is about 10 pF.

When air flows through the air-flow sensor in the direction as shown in FIG. 6B, suction due to the air flow will cause the resilient metallic membrane to bulge away from the back plate. As the separation (d) between the metallic membrane and the back plate increases in general under this condition, the capacitance value of the air-flow sensor will decrease in response to air flow in this direction.

On the other hand, when air flows in an opposite direction as shown in FIG. 6B, the resilient membrane is caused to deflect towards the back plate. As the separation distance between the metallic membrane and the back plate will decrease in general in this condition, the capacitance value will increase in response to air flow of this direction.

Figure 5:
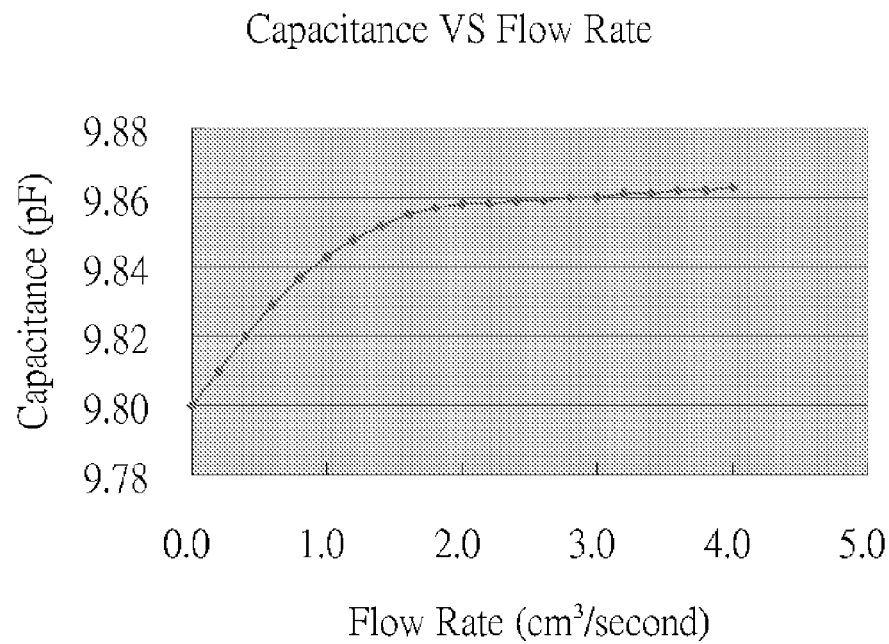
FIG. 5 shows an exemplary relationship between capacitance and air-flow rate of the air-flow sensor of FIG. 4, FIGS. 6A, 6B and 6C are schematic diagrams illustrating the air-flow sensor of FIG. 4 in standby mode (no air flow), under inhaling condition (suction), and under exhaling condition (blowing) respectively.

In ether cases, the resilience of the metallic membrane will return the membrane to the neutral condition of FIG. 6A when the air flow stops or when the air-flow rate is too low to cause instantaneous deflection or deformation of the metallic membrane. An exemplary variation of capacitance value of the air-rate sensor in response to air flow in the direction of FIG. 6B is shown in FIG. 5.

Figure 7:
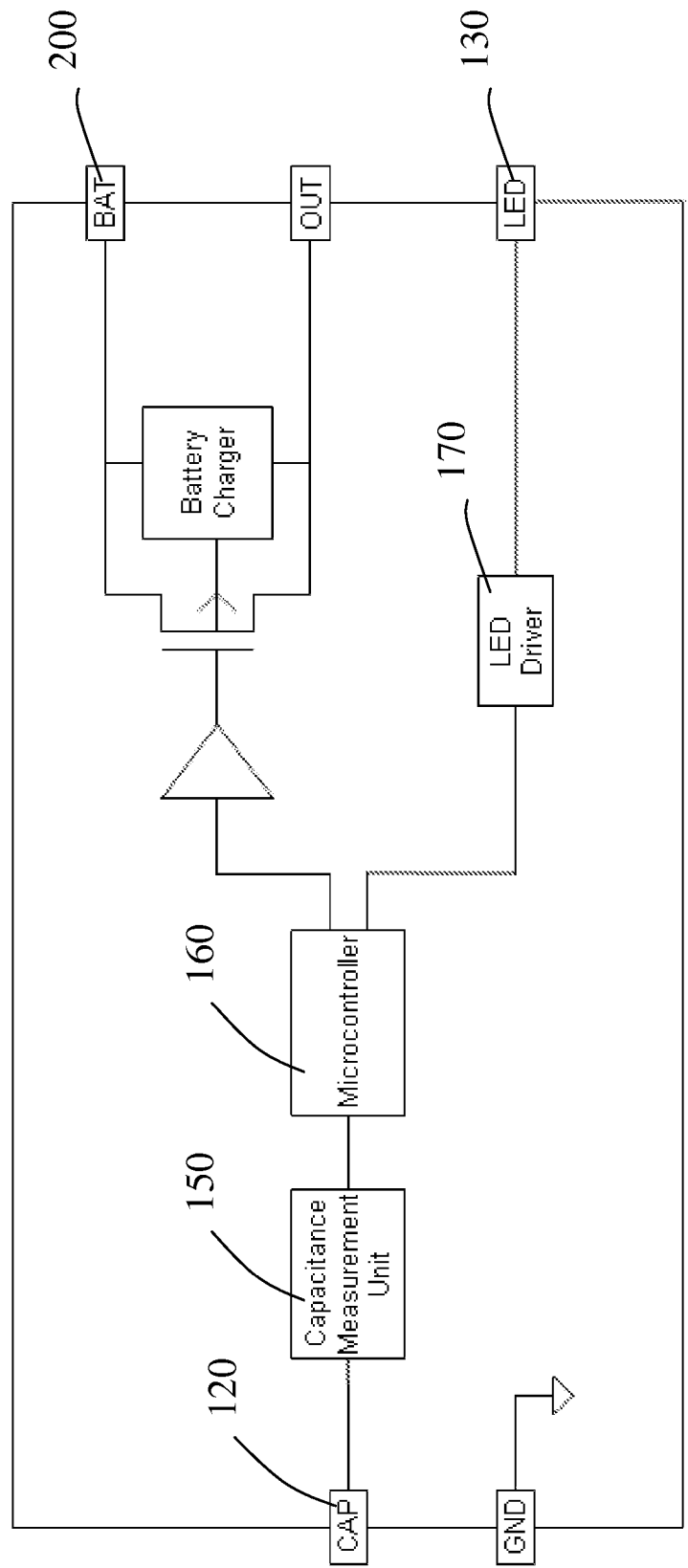
FIG. 7 is a schematic equivalent circuit diagram of an embodiment of an electronic smoke according to the present invention.

An application of the air flow sensor of FIG. 4 is depicted in an exemplary circuit of FIG. 7. Referring to FIG. 7, the air-flow sensor (marked CAP) is connected to a capacitance value measurement unit (150). The result of the capacitance value is transmitted to a microcontroller (160). If the result of the capacitance value measurement corresponds to a suction action of a sufficient air-flow rate, the microcontroller will send an actuation signal to operate the heater to cause vaporization of the nicotine stored in a nicotine pool. The nicotine vapor will be inhaled by a user through the mouth piece as a result of the inhaling action. The heater is connected to the BAT terminal of the circuit of FIG. 7. In addition, the actuation signal will also operate an LED driver (170) to operate an LED light source to provide a smoking indicator as a decoration.

To provide a simplified capacitance measurement arrangement, a digital signal processor (DSP) (180) is used as an example of the controller, and the air-flow sensor is used as a capacitor of an oscillator circuit of the DSP. In this regards, the capacitive output terminals of the air-flow sensor are connected to the oscillator input terminals of the DSP. Instead of measuring the actual capacitance of the air flow sensor, the present arrangement uses a simplified way to determine the capacitance value or the variation in capacitance by measuring the instantaneous oscillation frequency of the oscillator circuit or the instantaneous variation in oscillation frequency of the oscillator circuit compared to the neutral state frequency to determine the instantaneous capacitance value or the instantaneous variation in capacitance value. For example, the oscillation frequency of an oscillator circuit increases and decreases respectively when the capacitor forming part of the oscillator decreases and increases.

To utilize these frequency characteristics, the neutral frequency of the oscillator, that is, the oscillation frequency of the oscillator circuit of the DSP with the air-flow sensor in the condition of FIG. 6A is calibrated or calculated and then stored as a reference oscillation reference. The variation in oscillation frequency in response to a suction action is plotted against flow rate so that the DSP would send an actuation signal to the heater or the heater switch when an inhaling action reaching a threshold air-flow rate has been detected. On the other hand, the DSP will not actuate the heater if the action is a blowing action to mitigate false heater triggering.

Naturally, the detection threshold frequency would depend on the orientation of the air-flow sensor. For example, if the air-flow sensor is disposed within the main housing with the upper aperture facing the LED end of the electronic smoke, an increase in oscillation frequency (due to decrease in capacitance as FIG. 6B) of a sufficient threshold would correspond to a suction action of a threshold air-flow rate requiring heating activation, while a decrease in oscillation frequency (due to increase in capacitance as FIG. 6C) would correspond to a blowing action requiring no heating activation regardless of the air flow rate.

On the other hand, if the air-flow sensor is disposed in an opposite orientation such that the lower aperture is opposite the LED end, an increase in oscillation frequency (due to decrease in capacitance as FIG. 6B) of a sufficient threshold would correspond to a blowing action requiring no heater activation regardless of the air flow rate, while a decrease in oscillation frequency (due to increase in capacitance as FIG. 6C) would correspond to a suction action requiring heating activation when a threshold deviation in frequency is detected.

Figure 1:
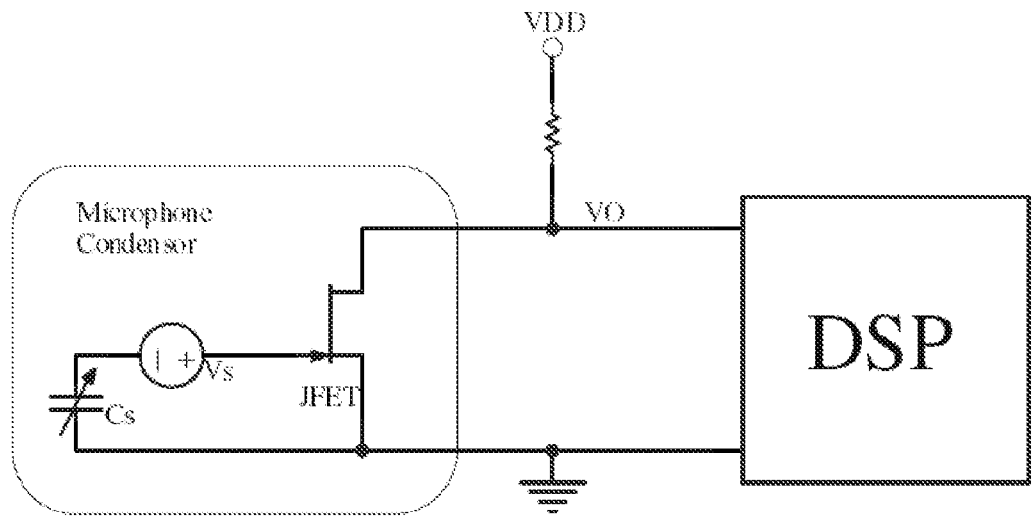
FIG. 1 is a schematic equivalent circuit diagram of an actuation circuit of a conventional electronic smoke.
Figure 2:
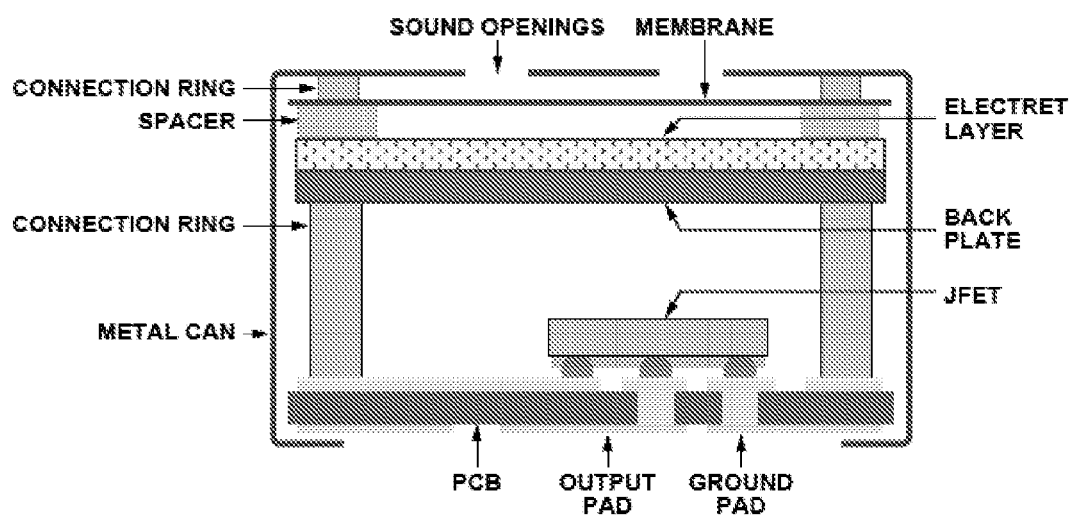
FIG. 2 is a schematic diagram of an air-flow sensor typically used in a conventional electronic smoke.
Figure 3:
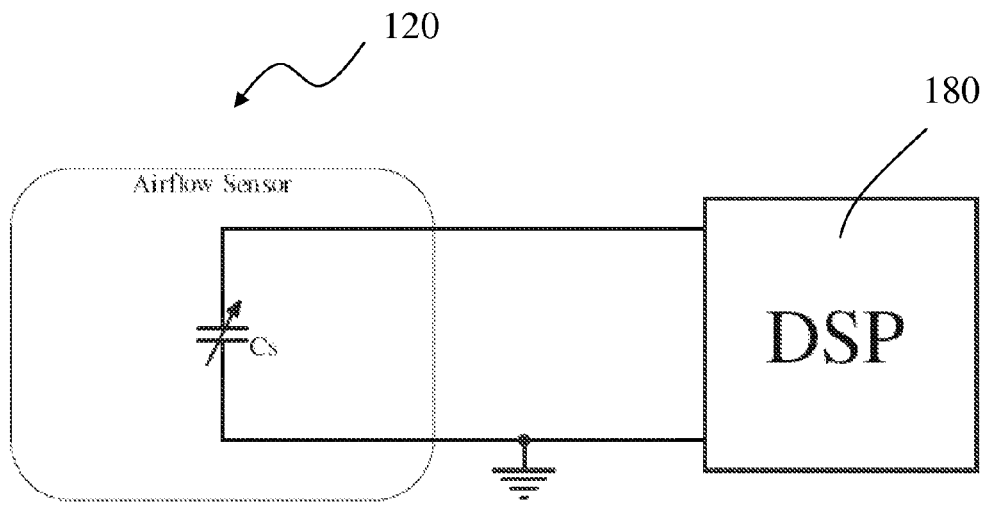
FIG. 3 is a schematic diagram of an actuation circuit of an electronic smoke according to an embodiment of an electronic smoke of the present invention.

The schematic equivalent circuit of FIG. 3 provides an useful reference to the characteristics above.

While the present invention has been explained with reference to the embodiments above, it will be appreciated that the embodiments are only for illustrations and should not be used as restrictive example when interpreting the scope of the invention.

| Table of Numerals | | | |
|---|---|---|---|
| 10 | Electronic cigarette | | |
| 100 | Inhale detector | | |
| | 120 | | Air-flow sensor |
| | | 121 | Conductive membrane |
| | | 122 | Conductive back plate |
| | | 123 | Insulating spacer |
| | | 124 | Earth plate |
| | | 125 | Conductive ring |
| | | 126 | Metallic can |
| | 130 | | LED light source |
| | 140 | | Printed Circuit Board |
| | 150 | | Capacitance measurement unit |
| | 160 | | Microcontroller |
| | 170 | | LED driver |
| | 180 | | Digital signal processor (DSP) |
| 200 | Battery | | |
| 300 | Heating element | | |
| 400 | Main housing | | |
| | 420 | | First tubular portion |
| | 440 | | Second tubular portion |
| | 460 | | Third tubular portion |
| | | 462 | Mouth piece |
| 500 | Cover | | |

The invention claimed is:

1. An electronic smoke apparatus comprising an inhale detector, a controller and a smoke effect generating circuitry, wherein the inhale detector comprises an air-flow sensor with a capacitor which forms part of an oscillator circuit and is arranged to detect direction and rate of air flow through the smoke apparatus, and the controller is arranged to operate the smoke effect generating circuitry to generate smoking effect when the air flow is in a direction corresponding to inhaling through the smoke apparatus and the air flow rate reaches a predetermined threshold, and wherein the controller is arranged to measure the oscillation frequency of the oscillation circuit to determine the air flow rate and direction.

2. An electronic smoke apparatus according to claim 1, wherein the oscillator circuit is part of the controller and the controller comprises an oscillator circuit input, and wherein output of the air-flow sensor is connected to the oscillator circuit input of the controller to provide variable capacitance input to the oscillator circuit.

3. An electronic smoke apparatus according to claim 2, wherein the controller is arranged to measure instantaneous oscillation frequency or instantaneous variation in oscillation frequency of the oscillator circuit to determine instantaneous capacitance value or instantaneous variation in capacitance value of the air flow sensor.

4. An electronic smoke apparatus according to claim 3, wherein the controller is arranged to determine whether a threshold air flow rate of an inhale action has been detected at the inhale detector with reference to the instantaneous oscillation frequency or instantaneous variation in oscillation frequency of the oscillator circuit measured by the controller.

5. An electronic smoke apparatus according to claim 4, wherein the controller is to send an actuation signal to actuate the smoke effect generating circuitry upon detection of an inhaling action that has reached the threshold air flow rate of the inhale action.

6. An electronic smoke apparatus according to claim 4, wherein the controller is not to actuate the smoke effect generating circuitry if a blowing action is detected at the smoke apparatus.

7. An electronic smoke apparatus according to claim 1, wherein the controller is arranged to measure instantaneous oscillation frequency or instantaneous variation in oscillation frequency of the oscillator circuit to determine instantaneous capacitance value or instantaneous variation in capacitance value of the air flow sensor.

8. An electronic smoke apparatus according to claim 7, wherein the controller is arranged to determine whether a threshold air-flow rate of an inhale action has been detected at the inhale detector with reference to the instantaneous oscillation frequency or instantaneous variation in oscillation frequency of the oscillator circuit measured by the controller.

9. An electronic smoke apparatus according to claim 8, wherein the controller is to send an actuation signal to actuate the smoke effect generating circuitry upon detection of an inhaling action that has reached the threshold air-flow rate of the inhale action.

10. An electronic smoke apparatus according to claim 9, wherein the controller is not to actuate the smoke effect generating circuitry if a blowing action is detected at the smoke apparatus.

11. An electronic smoke apparatus according to claim 1, wherein the air flow sensor is to output variable capacitance values to the oscillator circuit and the variable capacitance values vary according to the direction and rate of air flow through the smoke apparatus.

12. An electronic smoke apparatus according to claim 11, wherein the air flow sensor comprises a metallic baffle plate which is resiliently deformable and is to deform to change output capacitance values according to the direction and rate of air flow through the smoke apparatus.

13. An electronic smoke apparatus according to claim 10, wherein the controller is to send an actuation signal to actuate the smoke effect generating circuitry upon detection of an inhaling action that has reached the threshold air-flow rate of the inhale action and not to actuate the smoke effect generating circuitry if a blowing action is detected at the smoke apparatus.

14. An electronic smoke apparatus comprising an inhale detector and a smoke effect generating circuitry, wherein the inhale detector comprises an air-flow sensor which is arranged to detect direction and rate of air flow through the smoke apparatus, wherein the air-flow sensor comprises a capacitor, wherein the smoke effect generating circuitry is arranged to generate smoking effect when the air flow direction corresponds to inhaling through the apparatus and the air flow rate reaches a predetermined threshold, wherein the smoke effect generating circuitry comprises a processor which is adapted to measure capacitance or change in capacitance of the air-flow sensor, and wherein the air-flow sensor forms part of an oscillator circuit, and the processor is arranged to measure the oscillation frequency of the oscillation circuit to determine the air-flow rate and direction.

15. The electronic smoke apparatus, wherein the capacitor comprises a deformable air-baffle surface and a conductive back plate which are arranged in a spaced apart manner.

* * * * *

UNITED STATES PATENT AND TRADEMARK OFFICE
CERTIFICATE OF CORRECTION

| | | |
|---|---|---|
| PATENT NO. | : 9,072,321 B2 | Page 1 of 1 |
| APPLICATION NO. | : 13/131705 | |
| DATED | : July 7, 2015 | |
| INVENTOR(S) | : Liu | |

It is certified that error appears in the above-identified patent and that said Letters Patent is hereby corrected as shown below:

In the Claims:

Col. 7, line 16, Claim 15, "The electronic smoke apparatus" should read

--The electronic smoke apparatus according to claim 14--

Signed and Sealed this
Twelfth Day of January, 2016

Michelle K. Lee
*Director of the United States Patent and Trademark Office*